US010116952B2

(12) United States Patent
Lin et al.

(10) Patent No.: US 10,116,952 B2
(45) Date of Patent: Oct. 30, 2018

(54) BITSTREAM DECODING METHOD AND BITSTREAM DECODING CIRCUIT

(71) Applicant: MStar Semiconductor, Inc., Hsinchu Hsien (TW)

(72) Inventors: He-Yuan Lin, Zhubei (TW); Ya-Ting Yang, Zhubei (TW); Yi-Shin Tung, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 233 days.

(21) Appl. No.: 14/992,384

(22) Filed: Jan. 11, 2016

(65) Prior Publication Data

US 2017/0155918 A1   Jun. 1, 2017

(30) Foreign Application Priority Data

Nov. 30, 2015  (TW) .............................. 104139947 A

(51) Int. Cl.
| | |
|---|---|
| *H04N 7/12* | (2006.01) |
| *G06K 9/36* | (2006.01) |
| *H04N 19/44* | (2014.01) |
| *H04L 29/06* | (2006.01) |
| *H04N 19/172* | (2014.01) |
| *H04N 19/132* | (2014.01) |
| *H04N 19/156* | (2014.01) |

(52) U.S. Cl.
CPC ........... *H04N 19/44* (2014.11); *H04L 65/607* (2013.01); *H04N 19/132* (2014.11); *H04N 19/156* (2014.11); *H04N 19/172* (2014.11)

(58) Field of Classification Search
CPC ..... H04N 19/44; H04N 19/156; H04N 19/172
See application file for complete search history.

(56) References Cited

U.S. PATENT DOCUMENTS

| | | | |
|---|---|---|---|
| 7,096,481 B1 * | 8/2006 | Forecast .......... | H04N 21/23406 348/E5.008 |
| 2006/0067400 A1 * | 3/2006 | Zhang .................. | H04N 19/176 375/240.03 |
| 2010/0027663 A1 * | 2/2010 | Dai ...................... | H04N 19/159 375/240.16 |

(Continued)

FOREIGN PATENT DOCUMENTS

| | | |
|---|---|---|
| JP | 2011044771 A | 3/2011 |
| TW | 201029475 A | 8/2010 |
| WO | 2014005077 A1 | 1/2014 |

OTHER PUBLICATIONS

Schwarz et al., International Organisation for Standardistion Organisation Internationale de Normalisation ISO/IEC JTCI/SC29/WG11 Coding of Moving Pictures and Audio, Dec. 2011, 722 pages.

(Continued)

*Primary Examiner* — Tsion B Owens
(74) *Attorney, Agent, or Firm* — Edell, Shapiro & Finnan, LLC

(57) ABSTRACT

A stream decoding method is provided. The stream includes a plurality of frames. The method includes: obtaining a display order of a current frame that belongs to a group by parsing a header of the current frame; and determining whether to decode the current frame or to drop instead of decoding the current frame according to the display order of the current frame.

14 Claims, 6 Drawing Sheets

(56) References Cited

U.S. PATENT DOCUMENTS

| | | | |
|---|---|---|---|
| 2011/0310956 A1 | 12/2011 | Lin et al. | |
| 2013/0156104 A1* | 6/2013 | Chen ................. | H04N 21/4425 |
| | | | 375/240.15 |
| 2017/0064313 A1* | 3/2017 | Wu ....................... | H04N 19/33 |

OTHER PUBLICATIONS

TIPO Office Action, dated Nov. 9, 2016, 6 pages.
TIPO Office Action, dated Apr. 13, 2017, 6 pages.

* cited by examiner

BITSTREAM DECODING METHOD AND BITSTREAM DECODING CIRCUIT

This application claims the benefit of Taiwan application Serial No. 104139947, filed Nov. 30, 2015, the subject matter of which is incorporated herein by reference.

BACKGROUND OF THE INVENTION

Field of the Invention

The invention relates in general to a bitstream decoding method and an associated bitstream decoding circuit, and more particularly to a temporal scalable video bitstream decoding method and an associated bitstream decoding circuit capable of alleviating a decoding load and smoothly playing a video.

Description of the Related Art

A video is capable of presenting vivid visual information, and the video display function is also a development focus of modern electronic products. A video is a series of sequentially arranged frames. To facilitate the storage and transmission of the video, the frames in the video are encoded into a bitstream. To realize the video display function, these frames need to be first decoded from the bitstream before they can be played.

Video decoding may be performed by a hardware or software decoder. The decoding capability of a decoder is limited by the specifications of the decoder. If the frame rate of the video exceeds the specification of the decoder, the video cannot be smoothly displayed. For example, a decoder supporting a specification of 60 frames per second (fps) means that this decoder can decode and provide 60 frames maximum per second, and a video having a frame rate of 120 fps is considered over-spec for the decoder having a frame rate of 60 fps. If a decoder having a frame rate of 60 fps is applied for a video having a frame rate of 120 fps, the video cannot be smoothly displayed. Further, even if a video that does not exceed the specification of a decoder can be displayed, in the event that other software (e.g., a foreground application program) or firmware requests the decoder to release or suspend a part of the system resources during a display process of the video, the decoding capability of the decoder is also undesirably affected, and the number of decoded frames within unit time is then decreased.

SUMMARY OF THE INVENTION

The present invention is capable of appropriately selecting which frames in an over-spec video are to be dropped and left undecoded, such that an over-spec video can still be smoothly displayed to achieve temporal scalability. An object of the present invention is to provide a bitstream decoding method. The method includes: parsing a header of a current frame in the bitstream to obtain a display order of the current frame, wherein the current frame belongs to a group; and determining whether to decode the current frame or to drop instead of decoding the current frame according to the display order of the current frame. The step of determining whether to decode the current frame or to drop instead of decoding the current frame according to the display order of the current frame includes: determining whether the display order of the current frame is later than display orders of previous frames in the group according to the display order of the current frame; and decoding the current frame according to a determination result indicating that the display order of the current frame is later than the display orders of the previous frames.

The method may further include: obtaining one or multiple reference frames of the current frame by parsing the header of the current frame in the bitstream, determining whether to decode the current frame or to drop instead of decoding the current frame according to the one or multiple reference frames of the current frame. The step of determining whether to decode the current frame or to drop instead of decoding the current frame according to the one or multiple reference frames of the current frame includes: determining whether the current frame jointly refers to the frame having previous and adjacent display orders and the frame having a next display order in the group according to the one or multiple reference frames of the current frame; and dropping instead of decoding the current frame according to a determination result indicating that the current frame jointly refers the frame having the previous and adjacent display orders and the frame having the next display order in the group. The step of determining whether to decode the current frame or to drop instead of decoding the current frame according to the display order of the current frame further includes: determining whether the display order of the current frame is an integral multiple of a value; decoding the current frame according to a determination result indicating that the display order of the current frame is an integral multiple of the value; and dropping instead of decoding the current frame according to a determination result indicating that the display order of the current frame is not an integral multiple of the value.

It is another object of the present invention to provide a bitstream decoding circuit, which includes a control unit and a decoder coupled to the control unit. The control unit controls operations of the decoder to perform the method of the present invention.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
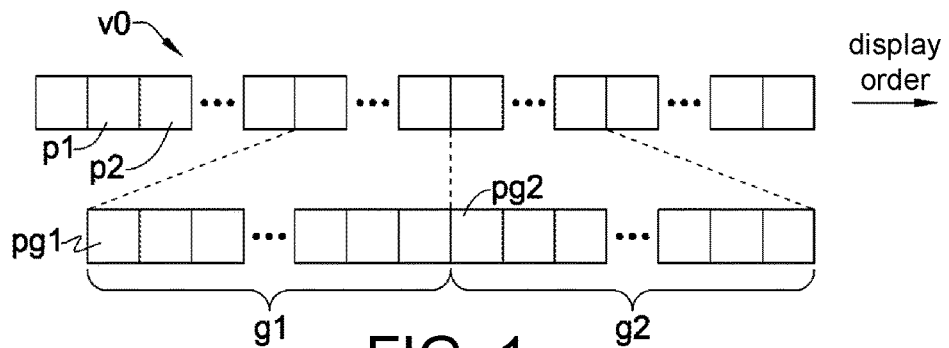
FIG. 1 shows a video and associated groups.

The present invention is capable of appropriately selecting which frames in an over-spec video are to be dropped and left undecoded, such that the over-spec video can still be smoothly displayed to achieve temporal scalability. Referring to FIG. 1, a video v0 may be formed by a series of sequentially arranged frames, e.g., frames p2, p2, pg2 and pg2. To display the video v0, the frames are also displayed according to the same orders. In other words, each of the frames in the video v0 corresponds to a display order. The frames in the video v0 may form one or more groups, e.g., groups g1 and g2. Each group may include one or multiple frames having successive display orders. For example, the group g1 includes multiple frames having successive display orders, wherein the frame pg1 is the frame having the earliest display order in the group g1; the group g2 includes multiple frames having successive display orders, wherein the frame pg2 is the frame having the earliest display order in the group g2.

The video v0 may be encoded into a bitstream according to cross-referral structures among the frames. In modern video encoding standards (e.g., MPEG4, H.264 and/or H.265), not any frame, only one frame having a previous display order, or one frame having a previous display order and one frame having a next display order, are referred when one frame is encoded. The cross-referral relationship among the frames affects the orders of the frames in the bitstream.

In continuation of FIG. 1, FIG. 2 to FIG. 7 are schematic diagrams of examples of various cross-referral structures. For illustration purposes, in the description below, "frame i" represents "a frame having a display order i", the frame having the earliest display order in the each group is the frame 0, the frame having a closely following display order is the frame 1, and so forth. The display orders of the frames may be learned from a frame order count (POC). In practice, for two frames having adjacent display orders, the values of the display orders of the two may be incremental by 1 or incremental by 2. For illustration purposes, the display orders of the two frames are regarded as incremental by 1.

Figure 2:
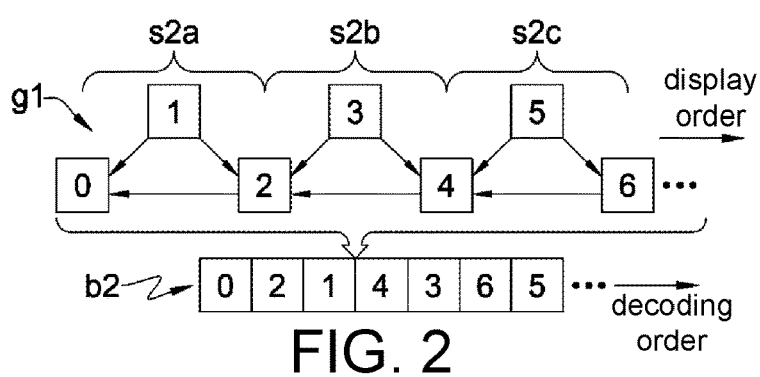
FIG. 2 to FIG. 8 are examples of cross-referral structures capable of encoding the video in FIG. 1 into a bitstream.

As shown in FIG. 2, the group g1 is encoded into a bitstream b2 according to a regular structure of "two frames as one unit" (e.g., structures s2*a*, s2*b* and s2*c*). In the structure s2*a*, the frame 1 has two arrows respectively pointing towards the frames 0 and 2, meaning that the frame 1 is a bi-directional predictive frame (B-frame), and the frames 0 and 2 are both referred when the frame 1 is encoded. On the other hand, the frame 2 has one arrow pointing towards the frame 0, meaning that the frame 2 is a one-directional predictive frame (P-frame), and the only the frame 0 is referred when the frame 2 is encoded. In response to the cross-referral relationship of the structure s2*a*, in the bitstream b2, the encoded frames 0 and 2 are arranged before the frame 1. When the decoder decodes the bitstream b2, the frame 0 is decoded first, the frame 2 is then decoded with reference to the frame 0, and the frame 1 is decoded with reference the frames 0 and 2 in sequence. In the structure s2*b*, the frame 3 refers to the frames 2 and 4, and so the frame 4 is arranged before the frame 3 in the bitstream b2. In the structure s2*c*, the frame 5 refers to the frames 4 and 6, and so the frame 6 is arranged before the frame 5 in the bitstream b2.

The orders of the encoded frames may also be referred to as decoding orders. Known from FIG. 2, the decoding order does not equal to the display order.

In the example in FIG. 2, the structures s2*a*, s2*b* and s2*c* are identical structures, as the cross-referral relationships all satisfy the same reference pattern. That is, the frame (2*i*) refers to the frame (2*i*-2), and the frame (2*i*-1) refers to the frame (2*i*-2) and the frame (2*i*).

Figure 3:
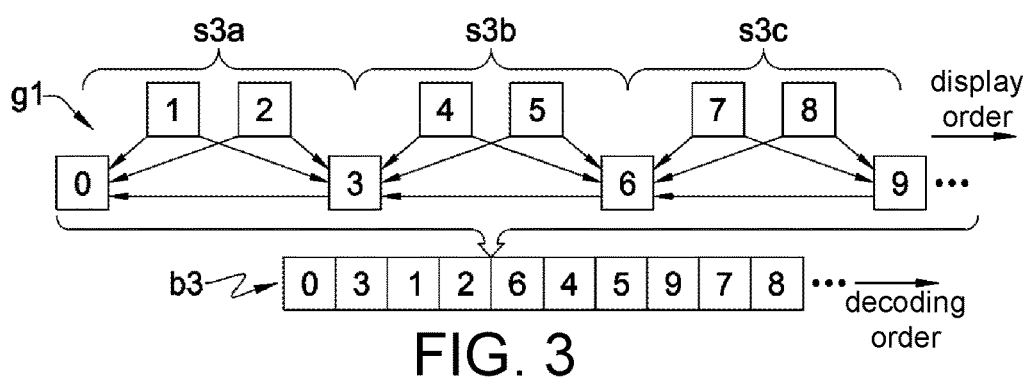

In FIG. 3, the frames in the group g3 are encoded into a bitstream b3 according to a regular structure of "three frames as one unit" (e.g., structures s3*a*, s3*b* and s3*c*). The structures s3*a*, s3*b* and s3*c* are identical structures, as the cross-referral relationships all satisfy the same reference pattern. That is, the frame (3*i*) refers to the frame (3*i*-3), the frame (3*i*-2) refers to the frame (3*i*-3) and the frame (3*i*), and the frame (3*i*-1) refers to the frame (3*i*-3) and the frame (3*i*).

Figure 4:
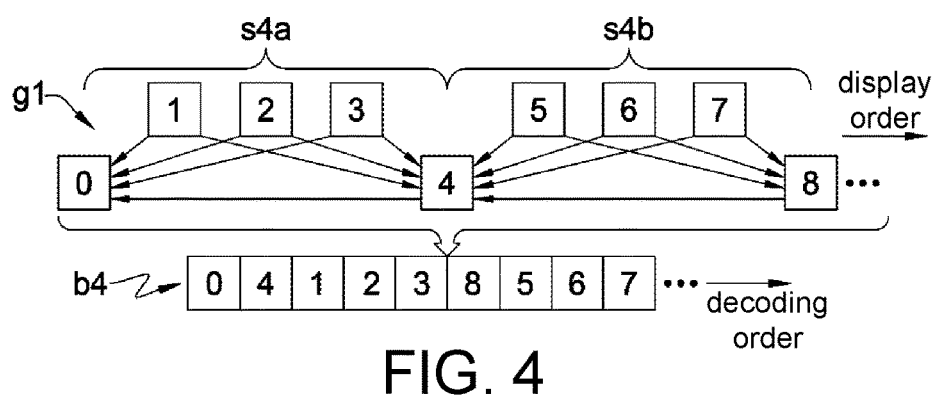

Similar to FIG. 2 and FIG. 3, in FIG. 4, the frames in the group g1 are encoded into a bitstream b4 according to a regular structure of "four frames as one unit" (e.g., structures s4*a* and s4*b*).

Figure 5:
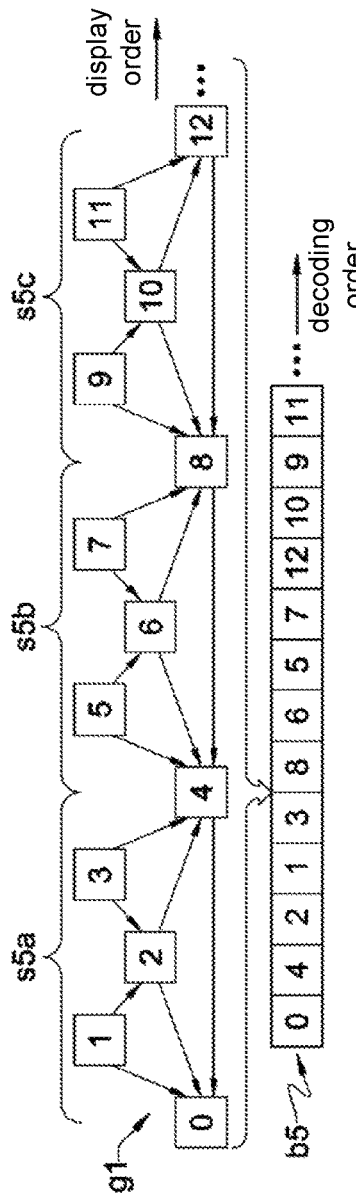

In FIG. 5, the frames in the group g1 are encoded into a bitstream b5 according to a four dyadic regular structure of "four frames as one unit" (e.g., s5*a*, s5*b* and s5*c*). The structures s5*a*, s5*b* and s5*c* are identical, and have a common reference pattern. That is, the frame (4*i*) refers to the frame (4*i*-4), the frame (4*i*-2) refers to the frame (4*i*) and the frame (4*i*-4), the frame (4*i*-3) refers to the frame (4*i*-4) and the frame (4*i*-2), and the frame (4*i*-1) refers to the frame (4*i*-2) and the frame (4*i*).

Figure 6:
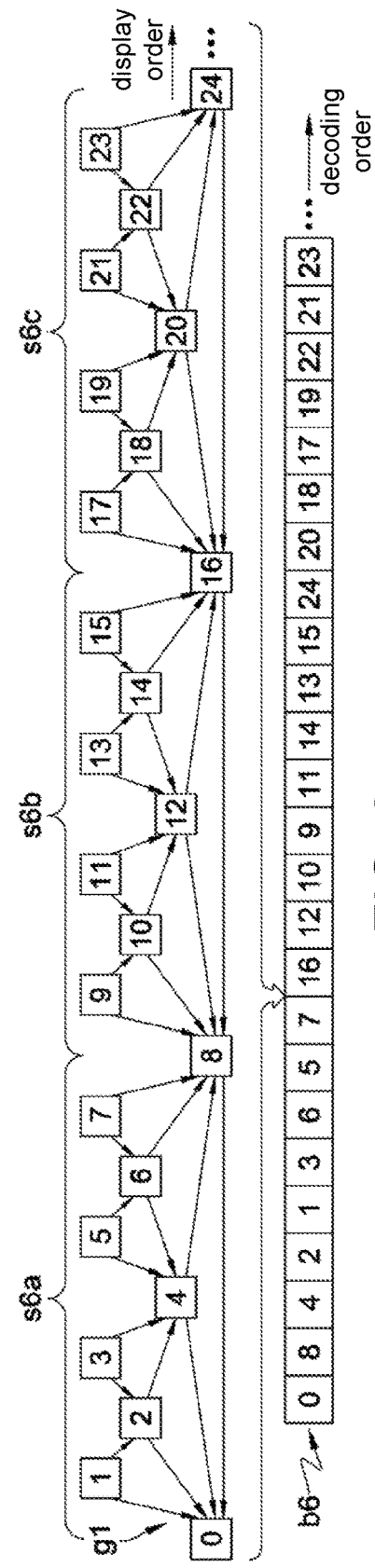

In FIG. 6, the frames in the group g1 are encoded into a bitstream b6 to a 8 dyadic regular structure of "eight frames as one unit" (e.g., structures s6*a*, s6*b* and s6*c*).

Figure 7:
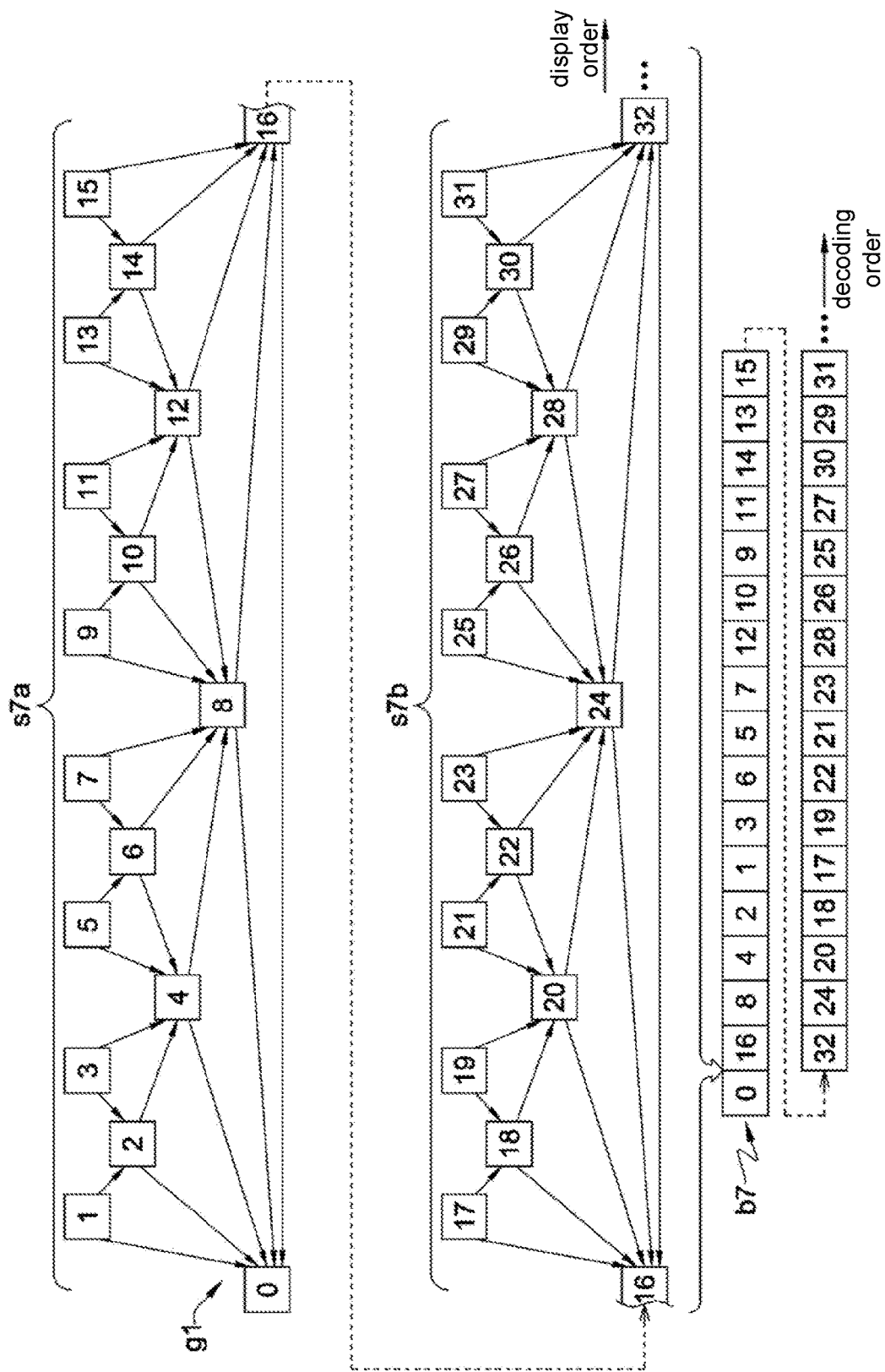

In FIG. 7, the frames in the group g1 are encoded into a bitstream b7 according to a 16 dyadic regular structure of "16 frames as one unit" (e.g., structures s7*a* and s7*b*).

Figure 8:
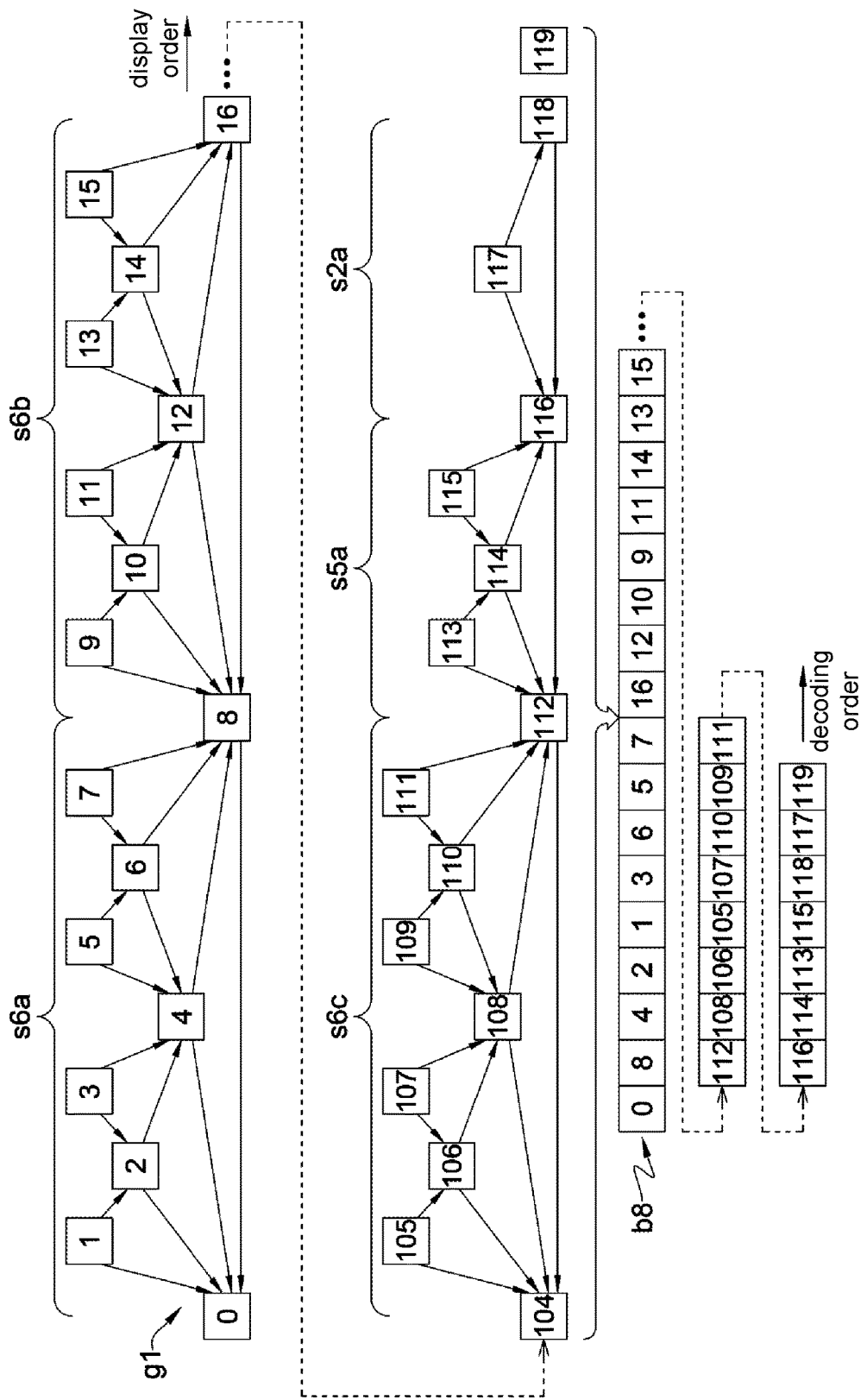

The frames in the same group may be encoded into a bitstream according to the same structure (as the examples in FIG. 2 to FIG. 7), or a part of frames in the same group may be encoded into a bitstream according to different structures. FIG. 8 shows an example of encoding with different structures. In the example in FIG. 8, the group g1 includes frames 0 to frames 119. The frames 0 to 112 are encoded into a bitstream b8 by repeating eight dyadic structures s6*a*, s6*b* and s6*c* having eight frames as one unit; the frames 112 to 116 are encoded into the bitstream b8 by a four dyadic structure having four frames as one unit (e.g., the structure 55*a*); the frames 116 to 118 are encoded into the bitstream b8 by a structure having two frames as one unit (e.g., the structure s2*a*); the frame 119 forms one structure by itself.

Figure 10:
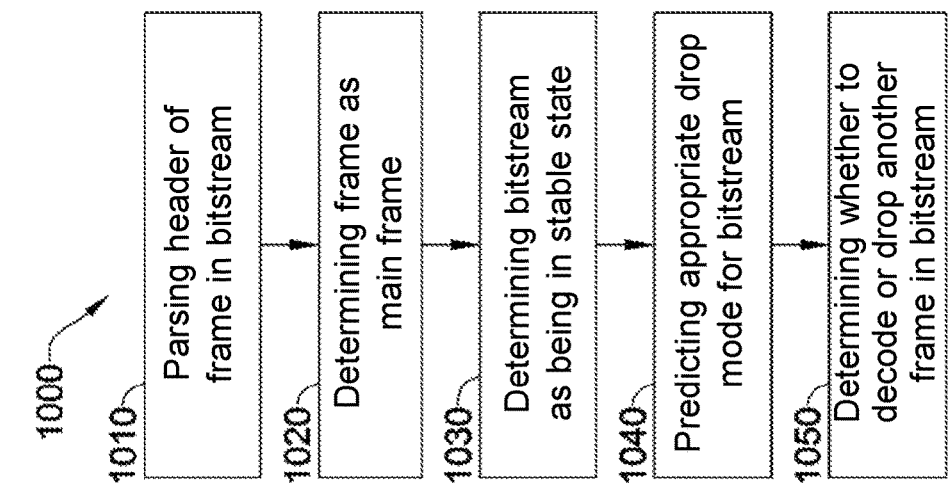
FIG. 10 is a flowchart according to an embodiment of the present invention.
Figure 9:
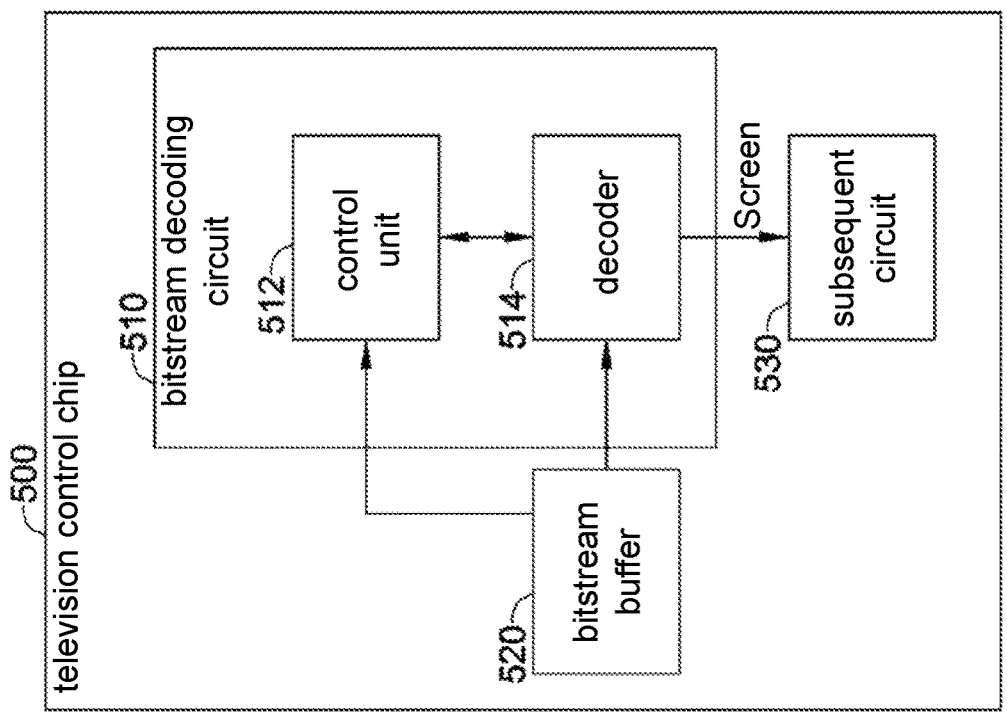
FIG. 9 shows a bitstream decoding circuit according to an embodiment of the present invention.

FIG. 9 shows a bitstream decoding circuit 510 according to an embodiment of the present invention. The bitstream decoding circuit 510 may include a control unit 512 and a decoder 514. The control unit 512 is coupled to the decoder 514. For example, the bitstream decoding circuit 510 may be included in a television control chip 500. The control unit 512 may be a logic operation and executing unit that executes software or firmware to accordingly control the decoder 514. The decoder 514 may be a hardware circuit. Under the control of the control unit 512, the decoder 514 is allowed to access frames in one bitstream from a bitstream buffer 520 in the television control chip 500, and decode the frames in the bitstream for a subsequent circuit 530 in the television control chip 500 to perform post processing. The decoded frames are outputted to a monitor (not shown) and displayed. The post processing may include: filtering the frames in the time-domain, adding special effects to the frames, synthesizing, editing and scaling the frames, and adjusting the speed of the frames (e.g., interpolating the frames to change the video into a slow-motion video). For example, the bitstream may include the bitstreams b2, b3, b4, b5, b6, b7 and/or b8 in FIG. 1 to FIG. 8. When the frame rate of the bitstream exceeds the decoding specification of the decoder 514, and/or the decoding capability of the decoder is affected when the decoder 514 is required to release or suspend certain system resources, the control unit 512 may perform a process 1000 shown in FIG. 10 to appropriately drop some of the frames in the bitstream and leave those frames undecoded, such that the video in the bitstream can still be displayed. Details of the process 1000 are as follows.

In step 1010, a header of a frame in a bitstream is parsed to obtain a display order and a reference frame of the frame. Taking FIG. 6 for example, assume that one bitstream includes the bitstream b6. In one example, the control unit 512 may access the header of the frame 0 from the bitstream buffer 520 in the television control chip 500, and parse the header of the frame 0 to learn that the display order of the frame 0 is 0 and frame 0 does not refer to any frames. In another example, the control unit 512 may access the frame 8 from the bitstream buffer 520 in the television control chip 500, and parse the header of the frame 8 to learn that the display order of the frame 8 is 8 and the reference frame of the frame 8 is the frame 0. In another example, the control unit 512 may access the frame 4 from the bitstream buffer 520 in the television chip 500, and parse the header of the frame 4 to learn that the display order of the frame 4 is 4 and the reference frames of the frame 4 are the frame 0 and the frame 8, and so forth.

In step 1020, it is determined whether the current frame is a main frame according to the display order of the frame. In one embodiment, if the display order of the current frame is later than the display order of a previous main frame, the current frame is determined as a main frame. Taking FIG. 6 for example, assume that the bitstream includes the bitstream b6, and the control unit 512 determines whether each of the frames in the bitstream is a main frame according to a decoding order (the frames 0, 8, 4, 2, 1, 3 . . . ). First, the control unit 512 determines that the frame 0 is a first main frame, as the frame 0 does not have a previous frame for comparison. The control unit 512 then determines that the frame 8 is a second main frame, as the display order of the frame 8 is later than the display order of the previous main frame 0. Next, the control unit 512 determines that the frame 4 is not a main frame, as the display order of the frame 4 is not later than the display order of the previous main frame 8. Similarly, the subsequent frames 2, 1, 3, 6, 5 and 7 are not determined as main frames, as the display orders of these frames are not later than the display order of the previous main frame 8. The control unit 512 then determines the frame 16 as a third main frame, as the display order of the frame 16 is later than the display order of the previous main frame 8. In conclusion, in the bitstream b6, the frames 0, 8, and 16 are respectively determined as the first main frame, the second main frame and the third main frame.

In step 1030, after the frame is determined as a main frame, the bitstream is determined as being in a stable state according to the display order of the frame. In one example, if the difference in the display orders of the third main frame and the second main frame is equal to the difference between the display orders of the second main frame and the first main frame, the bitstream is determined as being in a stable state. In continuation of the above example, after the frame 16 is determined as a third main frame, as the difference between the third main frame 16 and the second main frame 8 is 8 (16−8), which is equal to the difference of 8 (8−0) between the display orders of the second main frame 8 and the first main frame 0, the control unit 512 determines that the bitstream is in a stable state.

In step 1040, after the bitstream is determined as being in a stable state, an appropriate drop mode for the bitstream is predicted. In one example, among the frames between the second main frame and the third main frame (excluding the second main frame and the third main frame), if all frames having a display order that is an integral multiple of a value K do not refer to any frame having a display order that is not an integral of the value K, it is predicted that a 1/K drop mode is appropriate for the bitstream. The 1/K drop mode means that, for every K frames, only one frame is decoded while the remaining frames are not decoded. In continuation of the above example, among the frames 1 to 7 between the second main frame 8 and the third main frame 16, the frames having a display order that is an integral multiple of 2 are the frames 2, 4 and 6, and the frames having a display order that is not an integral multiple of 2 are the frames 1, 3, 5, and 7. Taking K=2 for instance , because the frame 2 refers to the frames 0 and 4, the frame 4 refers to the frames 0 and 8, and the frame 6 refers to the frames 4 and 8; that is to say, the frames 2, 4 and 6 having a display order that is an integral multiple of 2 do not refer to any of the frames 1, 3, 5 and 7, the control unit 512 predicts that a ½ drop mode is appropriate for the bitstream after the bitstream is determined as being in a stable state. In other words, even if the decoder 514 decodes only a half of the frames in the bitstream and does not decode the other half, the video is not hindered from being displayed.

It should be noted that, before the control unit 512 predicts the appropriate drop mode for the bitstream, the control unit 512 decodes all of the frames in the bitstream. In continuation of the above example, before the control unit 512 predicts the appropriate drop mode for the bitstream, the control unit 512 controls the decoder 514 to decode the frames 0 to 8 and the frame 16.

In step 1050, under the predicted drop mode, it is determined whether to decode or drop another frame in the bitstream. In one example, referring to FIG. 11, if a current frame is determined as a main frame (step 1110), the frame is decoded (step 1120). In continuation of the above example, after the control unit 512 predicts that the ½ drop mode is appropriate for the bitstream according to the frames 0, 8, 4, . . . , and 16, among the subsequent frames 12, 10, 9, . . . , and 24 in the bitstream, since the display order of the frame 24 is later than the display order of the previous main frame 16, the control unit 512 determines that frame 24 as a main frame and further controls the decoder 514 to decode the frame 24.

If a frame is not determined as a main frame (step 1110), and the frame jointly refers to the frames having previous and adjacent display orders and a next display order (step 1130), the frame is dropped and left undecoded (step 1140). In continuation of the above example, after the control unit 512 predicts that the ½ drop mode is appropriate for the bitstream according to the frames 0, 8, 4, . . . and 16, among the subsequent frames 12, 10, 9, . . . and 24 in the bitstream, the display orders of the frames 9, 11, 13 and 15 are not later than the display order of the previous main frame 16. Thus, the control unit 512 does not determine the frames 9, 11, 13 and 15 as main frames.

Further, the reference frames of the frame 9 are the frame 8 and the frame 10, the reference frames of the frame 11 are the frame 10 and the frame 12, the reference frames of the frame 13 are the frame 12 and the frame 14, and the reference frames of the frame 15 are the frame 14 and the frame 16. In other words, each of the frames 9, 11, 13 and 15 jointly refers to the frames having the previous and adjacent display orders and the next display order. Thus, the control unit 512 controls the decoder 514 to drop the frames 9, 11, 13 and 15 and leave these frames undecoded.

If a frame is not determined as a main frame (step 1110), and the frame does not jointly refer to the frames of previous and adjacent display orders and a next display order (step 1130), and the display order of the frame is an integral multiple of the value K (step 1150), the frame is decoded (step 1120). In continuation of the above example, after the control unit 512 predicts that the ½ drop mode is appropriate for the bitstream according to the frames 0, 8, 4, . . . and 16, among the frames 12, 10, 9, . . . and 24 in the bitstream, the display orders of the frames 10, 12 and 14 are not later than the display order of the previous main frame 16. Thus, the control unit 512 does not determine the frames 10, 12 and 14 as main frames. Further, the reference frames of the frame 10 are the frame 8 and the frame 12 (not the frame 9 and the frame 11), the reference frames of the frame 12 are the frame 8 and the frame 16 (not the frame 11 and the frame 13), and the reference frames of the frame 14 are the frame 12 and the frame 16 (not the frame 13 and the frame 15). In other words, the frames 10, 12 and 14 do not jointly refer the frames having the previous and adjacent display order and the next display order. Thus, the control unit 512 controls the decoder 514 to decode the frame 24.

Figure 11:
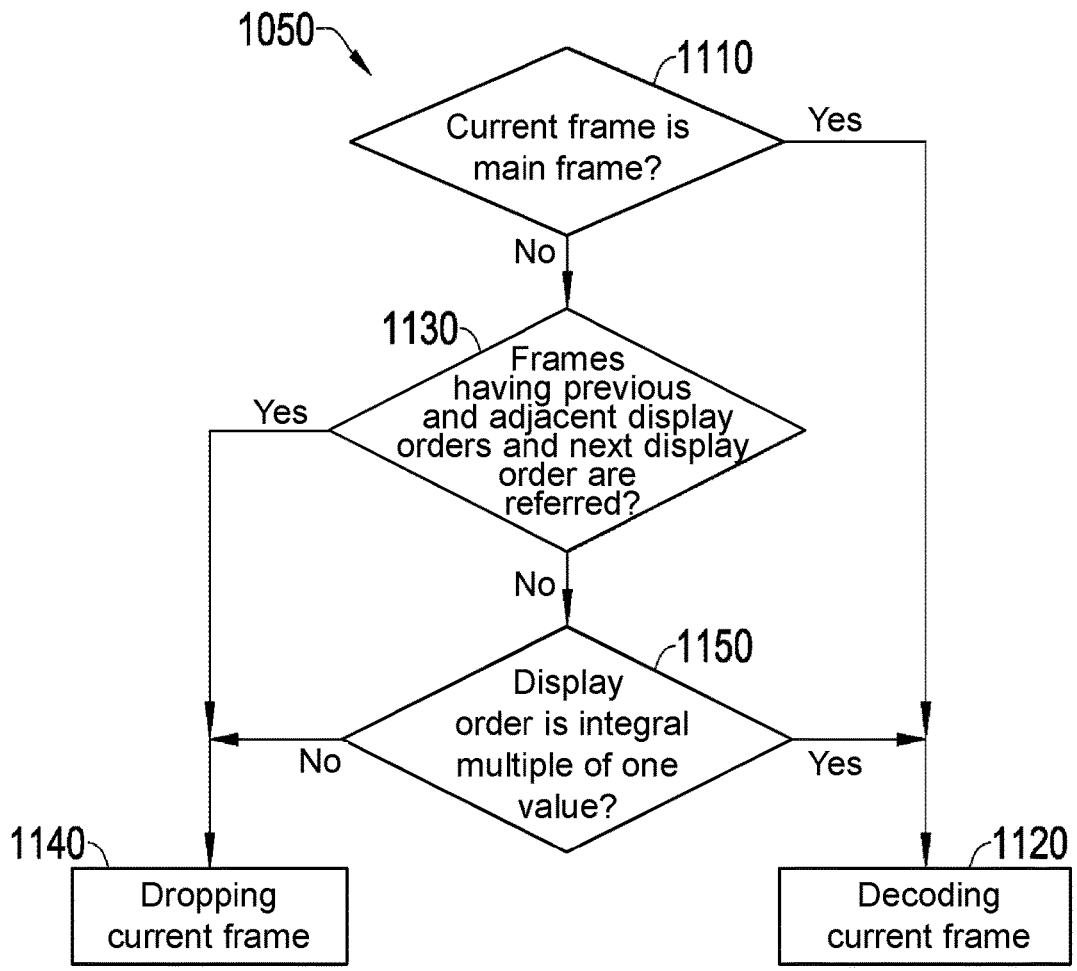
FIG. 11 shows operations of associated steps in FIG. 10.

In conclusion, after the control unit 512 predicts that the ½ drop mode is appropriate for the bitstream according to the frames 0, 8, 4, ... and 16, and after the subsequent frames 12, 10, 9, ... 24 in the bitstream undergo the process 1000 in FIG. 11, the control unit 512 controls the decoder 514 to decode the frames 10, 12, 14 and 24, and drops the frames 9, 11, 13 and 15 and leaves these frames undecoded. It is known from FIG. 6 that, the frames 10, 12, 14 and 24 do not refer to the frames 9, 11, 13 and 15. Thus, even if the frames 9, 11, 13 and 15 are dropped and left undecoded, the frames 10, 12, 14 and 24 are not hindered from being decoded. Therefore, the decoder 514 is capable of decoding a video that has a frame rate twice the specification of the decoder 514. For example, the decoder 514 having a specification of 60 fps is capable of decoding a video having a frame rate of 120 fps, such that the video having a frame rate of 120 fps can be displayed, thereby achieving temporal scalability.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for decoding a bitstream, the bitstream comprising a plurality of frames, the method comprising:
    receiving the bitstream at a decoding circuit, which performs steps of:
        obtaining a display order of a current frame in the bitstream by parsing a header of the current frame, the current frame belonging to a group; and
        determining whether to decode the current frame or to drop instead of decoding the current frame according to the display order of the current frame,
    wherein the step of determining whether to decode the current frame or to drop instead of decoding the current frame according to the display order of the current frame comprises:
    determining whether the display order of the current frame is later than display orders of previous frames in the group according to the display order of the current frame, and
    decoding the current frame according to a determination result indicating that the display order of the current frame is later than the display orders of all the previous frames in the group thereby ensuring that at least all P-frames of the group are decoded and not dropped.

2. The method according to claim 1, further comprising:
    obtaining one or multiple reference frames of the current frame by parsing the header of the current frame in the bitstream; and
    determining whether to decode the current frame or to drop instead of decoding the current frame according to the one or multiple reference frames of the current frame.

3. The method according to claim 2, wherein the step of determining whether to decode the current frame or to drop instead of decoding the current frame according to the one or multiple reference frames of the current frame comprises:
    determining whether the current frame jointly refers to the frame having previous and adjacent display orders and the frame having a next display order in the group according to the one or multiple reference frames.

4. The method according to claim 3, further comprising:
    dropping instead of decoding the current frame according to a determination result indicating that the current frame jointly refers to the frame having the previous and adjacent display orders and the frame having the next display order in the group.

5. The method according to claim 1, wherein the step of determining whether to decode the current frame or to drop instead of decoding the current frame according to the display order of the current frame according the display order of the current frame comprises:
    determining whether the display order of the current frame is an integral multiple of a value according to the display order of the current frame.

6. The method according to claim 5, further comprising:
    decoding the current frame according to a determination result indicating that the display order of the current frame is an integral multiple of the value.

7. The method according to claim 5, further comprising:
    dropping instead of decoding the current frame according to a determination result indicating that the display order of the current frame is not an integral multiple of the value.

8. A bitstream decoding circuit, comprising:
    a decoder, accessing a bitstream comprising a plurality of frames; and
    a control unit, coupled to the decoder, performing steps of:
        obtaining a display order of a current frame in the bitstream by parsing a header of the current frame, the current frame belonging to a group; and
        determining whether to decode the current frame or to drop instead of decoding the current frame according to the display order of the current frame,
    wherein the step of determining whether to decode the current frame or to drop instead of decoding the current frame according to the display order of the current frame comprises:
    determining whether the display order of the current frame is later than display orders of previous frames in the group according to the display order of the current frame
    wherein the control unit further performs a step of:
    controlling the decoder to decode the current frame according to a determination result indicating that the display order of the current frame is later than the display orders of all the previous frames in the group thereby ensuring that at least all P-frames of the group are decoded and not dropped.

9. The bitstream decoding circuit according to claim 8, wherein the control unit further performs a step of:
    obtaining one or multiple reference frames of the current frame by parsing the header of the current frame in the bitstream; and
    determining whether to decode the current frame or to drop instead of decoding the current frame according to the one or multiple reference frames of the current frame.

10. The bitstream decoding circuit according to claim 9, wherein the step of determining whether to decode the current frame or to drop instead of decoding the current frame according to the one or multiple reference frames of the current frame comprises:

determining whether the current frame jointly refers to the frame having previous and adjacent display orders and the frame having a next display order in the group according to the one or multiple reference frames.

11. The bitstream decoding circuit according to claim 10, wherein the control unit further performs a step of:

dropping instead of decoding the current frame according to a determination result indicating that the current frame jointly refers to the frame having the previous and adjacent display orders and the frame having the next display order in the group.

12. The bitstream decoding circuit according to claim 8, wherein the step of determining whether to decode the current frame or to drop instead of decoding the current frame according to the display order of the current frame according the display order of the current frame comprises:

determining whether the display order of the current frame is an integral multiple of a value according to the display order of the current frame.

13. The bitstream decoding circuit according to claim 12, wherein the control unit further performs a step of:

decoding the current frame according to a determination result indicating that the display order the current frame is an integral multiple of the value.

14. The bitstream decoding circuit according to claim 12, wherein the control unit further performs a step of:

dropping instead of decoding the current frame according to a determination result indicating that the display order of the current frame is not an integral multiple of the value.

* * * * *